United States Patent [19]

Yu et al.

[11] Patent Number: 5,208,192

[45] Date of Patent: May 4, 1993

[54] PRECERAMIC POLYSILAZANE COMPOSITIONS

[75] Inventors: Yuan-Fu Yu; Eric W. Liimatta, both of Baton Rouge, La.

[73] Assignee: Ethyl Corporation, Richmond, Va.

[21] Appl. No.: 647,533

[22] Filed: Jan. 15, 1991

Related U.S. Application Data

[63] Continuation-in-part of Ser. No. 552,872, Jul. 16, 1990, abandoned, which is a continuation-in-part of Ser. No. 464,229, Jan. 12, 1990, abandoned.

[51] Int. Cl.$^5$ ............... C04B 35/52; C04B 35/56; C04B 35/58
[52] U.S. Cl. ................................ 501/92; 501/88; 501/95; 501/96; 428/688; 264/62; 264/65; 524/442
[58] Field of Search ............... 501/17, 88, 90, 92, 501/95, 96; 528/15, 38; 427/228; 525/474, 478; 524/442, 443; 428/688; 264/62, 65

[56] References Cited

U.S. PATENT DOCUMENTS

| | | | |
|---|---|---|---|
| 4,482,669 | 12/1984 | Seyferth et al. | 524/442 |
| 4,645,807 | 2/1987 | Seyferth et al. | 525/474 |
| 4,650,837 | 3/1987 | Seyferth et al. | 525/478 |
| 4,689,252 | 8/1987 | Lebrun et al. | 427/228 |
| 4,719,273 | 1/1988 | Seyferth et al. | 528/15 |
| 4,835,207 | 5/1989 | Semen et al. | 524/443 |
| 4,869,854 | 9/1989 | Takeda et al. | 264/22 |
| 4,891,340 | 1/1990 | Semen et al. | 501/88 |

FOREIGN PATENT DOCUMENTS 0341923 5/1989 European Pat. Off.

*Primary Examiner*—Mark L. Bell
*Assistant Examiner*—Michael Marcheschi
*Attorney, Agent, or Firm*—Patricia J. Hogan

[57] ABSTRACT

A crosslinkable composition suitable for use as an infiltrant or as a binder for ceramic powders, such as silicon carbide and/or silicon nitride, in a formulation intended to be injection molded or extruded comprises about 40-70% by weight of a low molecular weight polysilazane, about 15-35% by weight of a medium molecular weight polysilazane, and about 5-30% by weight of an unsaturated organic or organosilicon compound containing at least two alkenyl groups. A preferred unsaturated compound is methylvinylcyclosilazane.

17 Claims, No Drawings

PRECERAMIC POLYSILAZANE COMPOSITIONS

CROSS-REFERENCES TO RELATED APPLICATIONS

This application is a continuation-in-part of copending application Ser. No. 552,872, filed Jul. 16, 1990, now abandoned, which in turn is a continuation-in-part of Ser. No. 464,229, filed Jan. 12, 1990, now abandoned.

FIELD OF INVENTION

This invention relates to polysilazane compositions having improved flow and more particularly to such compositions which are useful as infiltrants and as binders for ceramic powders.

BACKGROUND

As disclosed in U.S. Pat. No. 4,482,669 (Seyferth et al.-I), U.S. Pat. No. 4,645,807 (Seyferth et al.-II), U.S. Pat. No. 4,650,837 (Seyferth et al.-III), U.S. Pat. No. 4,835,207 (Semen et al.-I), U.S. Pat. No. 4,869,854 (Takeda et al.), and U.S. Pat. No. 4,895,889 (Semen et al.-II), it is known that polysilazanes can be used as binders for ceramic powders, such as silicon carbide and silicon nitride, to prepare molding compositions suitable for the production of ceramic articles. However, the known compositions have not proved to be entirely satisfactory for the production of articles by techniques requiring high flow, e.g., injection molding and extrusion processes.

The known polysilazanes can also be used to infiltrate fiber-reinforced ceramic composites and thus increase their density and strength, but their viscosities are higher and their ceramic yields lower than is desirable for an infiltrant.

SUMMARY OF INVENTION

It has now been found that compositions suitable for use as infiltrants and as binders for ceramic powders in formulations intended to be injection molded or extruded can be obtained by the provision of a crosslinkable preceramic composition comprising about 40-70% by weight of a low molecular weight polysilazane, about 15-35% by weight of a medium molecular weight polysilazane, and about 5-30% by weight of an unsaturated organic or organosilicon compound containing at least two alkenyl groups.

DETAILED DESCRIPTION

The polysilazanes used in the practice of the invention may be any suitable polysilazanes having appropriate molecular weights. For example, they may be the polysilazanes of any of Seyferth et al.-I, -II, and -III, Semen et al.-I and -II, Takeda et al., and U.S. Pat. No. 4,297,828 (Seyferth et al.-IV) and U.S. Pat. No. 4,659,850 (Arai et al.), the teachings of all of which are incorporated herein by reference.

In a preferred embodiment of the invention, the low and medium molecular weight polysilazanes are ones which have respective relative viscosities of 1.12–1.16 and 1.3–1.4, measured as solutions of 5% by weight of the polymers in tetrahydrofuran: and both polysilazanes are polymers prepared by the process of Seyferth et al.-I, i.e., by reacting an organodihalosilane, such as methyldichlorosilane, with ammonia and polymerizing the ammonolysis product with a basic deprotonation catalyst, such as potassium hydride.

The unsaturated compound employed in the composition is an organic or organosilicon compound containing at least two alkenyl groups. Such compounds are known, as evidenced by U.S. Pat. No. 4,719,273 (Seyferth et al.-V), the teachings of which are incorporated herein by reference. As in Seyferth et al.-V, the alkenyl groups are preferably alkenyl groups containing 2–6 carbons, such as vinyl, allyl, 3-butenyl, α-propenyl, etc.; and the utilizable compounds include organic compounds such as divinylbenzene, polybutadienes having a high 1,2 content, β-trivinyl-N-triphenylborazine, triallylcyanurate, etc. However, also as in Seyferth et al.-V, the preferred compounds are organosilicon compounds in which the alkenyl groups are substituted or unsubstituted vinyl or allyl groups, most preferably unsubstituted vinyl groups.

Among the more preferred unsaturated compounds for use in the compositions are organosilicon compounds corresponding to the formulas:

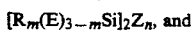

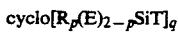

wherein E is a substituted or unsubstituted vinyl or allyl group; Z is O, S, NH, NR', methylene, ethylene, phenylene, or other organic bridge; T is O, S, NH, NR', methylene, CH=CH, or C≡C; R and R' are independently selected from substituted and unsubstituted alkyl groups containing 1–6 carbons and substituted and unsubstituted aryl groups containing 6–10 carbons; m is 0, 1, or 2; n and p represent 0 or 1; and q is at least 3 when T is O and is otherwise at least 2.

The most preferred unsaturated compounds are the organosilicon compounds corresponding to the formula:

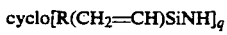

especially those in which R is methyl and q is at least 3 and including mixtures thereof, e.g., methylvinylcyclosilazane. However, other particularly desirable unsaturated compounds are the coammonolysis products of R(CH$_2$=CH)SiCl$_2$ and RSiHCl$_2$, especially those in which R is methyl.

In addition to the aforementioned ingredients, the compositions of the invention may contain any other ingredients that are appropriate for the use that is to be made of the compositions. For example:

(A) when the composition is to be used as an infiltrant for fiber-reinforced ceramic composites, it is sometimes dissolved in a solvent, usually a common organic solvent, such as an aliphatic or aromatic hydrocarbon or a dialkyl or alicyclic ether, (B) when the composition is to be used as a binder for a ceramic powder in a formulation intended for injection molding or extrusion, the preceramic composition is intimately mixed with a ceramic powder, such as silicon carbide and/or silicon nitride, preferably a powder having a particle size not larger than about five micrometers, more preferably not larger than one micrometer, suitably with the use of a solvent and/or a polyisobutenyl succinimide or other dispersant, to form a blend comprising about 15–30% by weight of the preceramic composition and about 85–70% by weight of the ceramic powder, and (C) when the composition is to be used as a binder for a ceramic powder in a formulation intended for use in forming the matrix of a fiber/matrix composite, it is apt to be formed in essentially the same way as described above except that the source of the ceramic powder is sometimes a ceramic powder/polysilazane mixture containing up to 30% by weight of the polysilazane, and the ingredients are used in amounts such that the blend comprises about 30–60% by weight of the preceramic composition and about 70–40% by weight of (1) 100–70% by weight of the ceramic powder and (2) 0–30% by weight of one or more polysilazanes, the molecular weights of which are not critical.

The unsaturated compounds used in the compositions are liquids which improve the flowability of the formulations and which react with the polysilazanes at the temperatures employed in forming injection molded or extruded articles, composite prepregs, or infiltrated composites. Crosslinking of the compositions is achieved by the utilization of a use temperature sufficient to effect crosslinking, usually a temperature of at least about 80° C., in the presence of a catalyst, usually a free radical catalyst, such as those employed in the hydrosilylation process of Seyferth et al.-V, and preferably an azo catalyst, such as azobisisobutyronitrile.

When the compositions are to be injection molded, they are injected into a mold and heated at a temperature of at least about 80° C., preferably about 80°–150° C., most preferably about 100° C., to crosslink them and enable them to retain the shape imparted to them by the mold. Similar temperatures are employed when they are used in extrusion processes. A preferred composition for use in such injection molding and extrusion processes comprises about 75% by weight of ceramic powder, about 15% by weight of the low molecular weight polysilazane, about 5% by weight of the medium molecular weight polysilazane, and about 5% by weight of the unsaturated compound.

In using the compositions to form the matrix of a composite, conventional techniques are used. Thus, suitable fibers, which may be loose fibers or fibers which have been woven into a mat, are generally coated with a solution of the crosslinkable preceramic composition or with a slurry of the ceramic powder/preceramic blend described above by painting them with a brush or cloth or by dipping them in the solution or slurry and are then dried to form a prepreg. Layers of the prepreg, usually after being cut into the same size, can then be laminated together, e.g., by stacking them and placing them in an autoclave in which they are heated under pressure, e.g., by heating them to 150° C. under vacuum in a vacuum bag with a nitrogen overpressure of about 1.4 Mpa at a rate of 60° C./hour and holding them at 150° C. for about 15 minutes before cooling them at a rate of 120° C./hour, to form a composite.

A preferred composition for use in forming a matrix comprises about 60% by weight of a 75/25 silicon carbide/polysilazane mixture, about 25% by weight of the low molecular weight polysilazane, about 10% by weight of the medium molecular weight polysilazane, and about 5% by weight of the unsaturated compound. Preferred fibers for use as reinforcing materials are oxidation-resistant carbon fibers, i.e., carbon fibers that have been provided with a coating that protects them from oxidative deterioration at elevated temperatures, e.g., a ceramic coating.

When the compositions of the invention are used as infiltrants, as mentioned above, they are sometimes used as solutions in a suitable organic solvent; but they can also be utilized in molten form. In either case, infiltration may be accomplished by immersing the piece to be infiltrated, e.g., a fiber-reinforced ceramic composite, in the solution or melt and employing pressure, usually a pressure of at least about 200 kPa, to maximize the amount of infiltration. When melt infiltration is effected, the process is ordinarily performed at a temperature sufficiently high to cause crosslinking to occur; and, when the infiltration is accomplished with a solution at ambient temperatures, crosslinking can be effected after the infiltrated piece has been removed from the solution. A piece containing crosslinked infiltrant may be reinfiltrated one or more times after being pyrolyzed when it is desired to increase the amount of infiltrant incorporated.

Articles formed by the various uses of the invention mentioned above may be converted into ceramic articles by pyrolyzing them under suitable conditions, e.g., by heating them at a temperature of at least about 850° C., usually not higher than about 1450° C., in an inert atmosphere, such as nitrogen or argon.

The invention is advantageous in that the compositions have an improved flowability that makes them more suitable than known polysilazane compositions for use in injection molding, extrusion, and infiltration processes. Moreover, composites in which the matrix is formed by the use of the compositions have better dimensional stability than composites formed by the use of known polysilazane compositions and thus show less bloating when pyrolyzed.

The following examples are given to illustrate the invention and are not intended as a limitation thereof. Unless otherwise specified, quantities mentioned in the examples are quantities by weight.

In these examples, the polysilazanes are products obtained by reacting methyldichlorosilane with ammonia and polymerizing the ammonolysis product with potassium hydride, as in Seyferth et al.-I, the low molecular weight polysilazane is one having a relative viscosity of 1.12–1.16, measured as a solution of 5% by weight of the polymer in tetrahydrofuran; and the medium molecular weight polysilazane is one having a relative viscosity of 1.3–1.4, measured in the same manner.

EXAMPLE I

Inside a dry box charge a suitable vessel with 45 parts of the low molecular weight polysilazane, 15 parts of the medium molecular weight polysilazane, 15 parts of methylvinylcyclosilazane, 2.25 parts of azobisisobutyronitrile, one part of a commercial polyisobutenyl succinimide dispersant, and 135 parts of distilled tetrahydrofuran. Stir the mixture magnetically for five minutes to dissolve the azobisisobutyronitrile and dispersant, and then add 225 parts of SiC powder and 0.15 part of dimethylchlorosilane. Remove the vessel from the dry box, and subject the mixture to magnetic stirring for 10 minutes and ultrasonic dispersion for one hour. Return the vessel to the dry box. Remove the solvent by rotary evaporation followed by vacuum drying, and roll the dried formulation into tapes having a thickness of about 75–100 micrometers.

EXAMPLE II

Feed the tapes of Example I into a reciprocating-screw injection molding machine, the injection barrel and nozzle of which have been preheated to 100° C. Mold the formulation at 100° C. cool the mold to 50° C. to solidify the molded part, and remove the molded green part from the mold. The injection molded green part has a density of about 2.12 g/cc.

When methylvinylcyclosilazane is eliminated from the formulation to provide a molding composition of the type taught in Semen et al.-I, a part cannot be molded by the process of Example II. Screw movement is incapable of transferring the formulation beyond the injection barrel.

EXAMPLE III

Dissolve 24 parts of the low molecular weight polysilazane, 10 parts of the medium molecular weight polysilazane, six parts of methylvinylcyclosilazane, and two parts of azobisisobutronitrile in 43 parts of distilled tetrahydrofuran in an inert atmosphere. Stir the solution for 30 minutes, and strip off the tetrahydrofuran under vacuum. Dissolve the product in 16 parts of toluene and mix 60 parts of a 75/25 SiC powder/polysilazane mixture therewith to form a slurry.

EXAMPLE IV

Paint the slurry of Example III onto oxidation-resistant carbon fibers and allow the painted fibers to dry in an inert atmosphere to form a prepreg. Cut the prepreg into uniform pieces, stack the pieces, place the stack in an autoclave, and apply a vacuum for 10 minutes. Then heat the stack of prepreg in a vacuum bag (1.3 kPa) to 150° C. at a rate of 60° C./hour under a nitrogen overpressure of about 1.4 Mpa, hold at 150° C. for 15 minutes, and cool at a rate of 120° C./hour to form a composite. Remove the composite from the autoclave and pyrolyze it at 850°–1300° C. in an inert atmosphere to form a fiber-reinforced ceramic composite.

EXAMPLE V

Dissolve 50 parts of the low molecular weight polysilazane, 25 parts of the medium molecular weight polysilazane, 25 parts of methylvinylcyclosilazane, and four parts of azobisisobutyronitrile in 140 parts of distilled tetrahydrofuran in an inert atmosphere. Stir the solution for 30 minutes and strip off the tetrahydrofuran under vacuum. Then dissolve the product in 64 parts of xylene.

EXAMPLE VI

Place the fiber-reinforced ceramic composite of Example IV in a stainless steel pressure-infiltration device and completely cover it with product solution of Example V. Pressurize the infiltration device to at least 200 kPa with nitrogen, release the pressure after one hour, take the infiltrated composite out of the polymer solution, and wipe off the excess polymer. Heat the infiltrated composite to 300° C. to crosslink the infiltrant, and then heat at 850°–1400° C. to pyrolyze it. The product has a higher density and strength than the product of Example IV. Then repeat the infiltration, crosslinking, and pyrolysis. The density and strength of the product are further increased.

What is claimed is:

1. A crosslinkable preceramic composition comprising about 40–70% by weight of a low molecular weight polysilazane having a relative viscosity of 1.12–1.16, measured as a solution of 5% by weight of the polymer in tetrahydrofuran, about 15–35% by weight of a medium molecular weight polysilazane having a relative viscosity of 1.3–1.4, measured as a solution of 5% by weight of the polymer in tetrahydrofuran, and about 5–30% by weight of an unsaturated organic or organosilicon compound containing at least two alkenyl groups.

2. The composition of claim 1 wherein the polysilazanes are polymers which have been prepared by reacting an organodihalosilane with ammonia and polymerizing the ammonolysis product with a basic deprotonation catalyst.

3. The composition of claim 2 wherein the organodihalosilane is methyldichlorosilane and the basic catalyst is potassium hydride.

4. The composition of claim 1 wherein the unsaturated compound is an organosilicon compound.

5. The composition of claim 4 wherein the organosilicon compound is a compound corresponding to one of the formulas:

$$SiE_4,$$

$$[R_m(E)_{3-m}Si]_2Z_n, \text{ and}$$

$$cyclo[R_p(E)_{2-p}SiT]_q$$

wherein E is a substituted or unsubstituted vinyl or allyl group; Z is O, S, NH, NR', methylene, ethylene, phenylene, or other organic bridge; T is O, S, NH, NR', methylene, CH=CH, or C≡C; R and R' are independently selected from substituted and unsubstituted alkyl groups containing 1–6 carbons and substituted and unsubstituted aryl groups containing 6–10 carbons; m is 0, 1, or 2; n and p represent 0 or 1; and q is at least 3 when T is O and is otherwise at least 2.

6. The composition of claim 5 wherein the organosilicon compound is one or more compounds corresponding to the formula $cyclo[R(CH_2=CH)SiNH]_q$.

7. The composition of claim 6 wherein R is methyl and q is at least 3.

8. The composition of claim 1 containing a free radical initiator as a catalyst to promote crosslinking.

9. A composition suitable for use in injection molding and comprising about 15–30% by weight of the composition of claim 1 and about 85–70% by weight of a ceramic powder selected from silicon carbide, silicon nitride, and mixtures thereof.

10. The composition of claim 9 comprising about 75% by weight of silicon carbide, about 15% by weight of the low molecular weight polysilazane, about 5% by weight of the medium molecular weight polysilazane, about 5% by weight of one or more compounds corresponding to the formula $cyclo[CH_3(CH_2=CH)SiNH]_q$ wherein q is at least 3, and a catalytic amount of azobisisobutyronitrile; the polysilazanes being polymers which have been prepared by reacting methyldichlorosilane with ammonia and polymerizing the ammonolysis product with potassium hydride.

11. A process which comprises (A) injecting into a mold a crosslinkable injection molding composition comprising (1) about 70–85% by weight of a ceramic powder selected from silicon carbide, silicon nitride, and mixtures thereof and (2) about 30–15% by weight of a preceramic composition comprising about 40–70% by weight of a low molecular weight polysilazane having a relative viscosity of 1.12–1.16, measured as a solution of 5% by weight of the polymer in tetrahydrofuran, about 15–35% by weight of a medium molecular weight polysilazane having a relative viscosity of 1.3–1.4, measured as a solution of 5% by weight of the polymer in tetrahydrofuran, and about 5–30% by weight of an unsaturated organic or organosilicon compound containing at least two alkenyl groups and (B) heating the molding composition at a temperature sufficient to effect crosslinking.

12. A composition suitable for use in forming the matrix of a fiber/matrix composite and comprising about 30–60% by weight of the composition of claim 1 and about 70–40% by weight of (A) carbide, silicon nitride, and mixtures thereof and (B) 0–30% by weight of one or more polysilazanes.

13. The composition of claim 12 comprising about 60% by weight of a 75/25 silicon carbide/polysilazane mixture, about 25% by weight of the low molecular weight polysilazane, about 10% by weight of the medium molecular weight polysilazane, about 5% by weight of one or more compounds corresponding to the formula cyclo[$CH_3(CH_2=CH)SiNH$]$_q$ wherein q is at least 3, and a catalytic amount of azobisisobutyronitrile; the polysilazanes being polymers which have been prepared by reacting methyldichlorosilane with ammonia and polymerizing the ammonolysis product with potassium hydride and which have respective relative viscosities of 1.12–1.16 and 1.3–1.4, measured as solutions of 5% by weight of the polymers in tetrahydrofuran.

14. A prepreg comprising oxidation-resistant carbon fibers bonded in the composition of claim 12 as a matrix.

15. A fiber-reinforced ceramic composite comprising oxidation-resistant carbon fibers bonded in a silicon carbide/silicon nitride ceramic matrix and prepared by laminating layers of the prepreg of claim 14 and heating the resultant laminate at a temperature of at least 850° C. to pyrolyze the matrix.

16. A prepreg comprising oxidation-resistant carbon fibers bonded in the composition of claim 1 as a matrix.

17. A fiber-reinforced ceramic composite comprising oxidation-resistant carbon fibers bonded in a ceramic matrix and prepared by laminating layers of the prepreg of claim 16 and heating the resultant laminate at a temperature of at least 850° C. to pyrolyze the matrix.

* * * * *